May 19, 1970     W. R. BOATNER     3,512,321
STORAGE BIN
Filed May 31, 1968     2 Sheets-Sheet 2
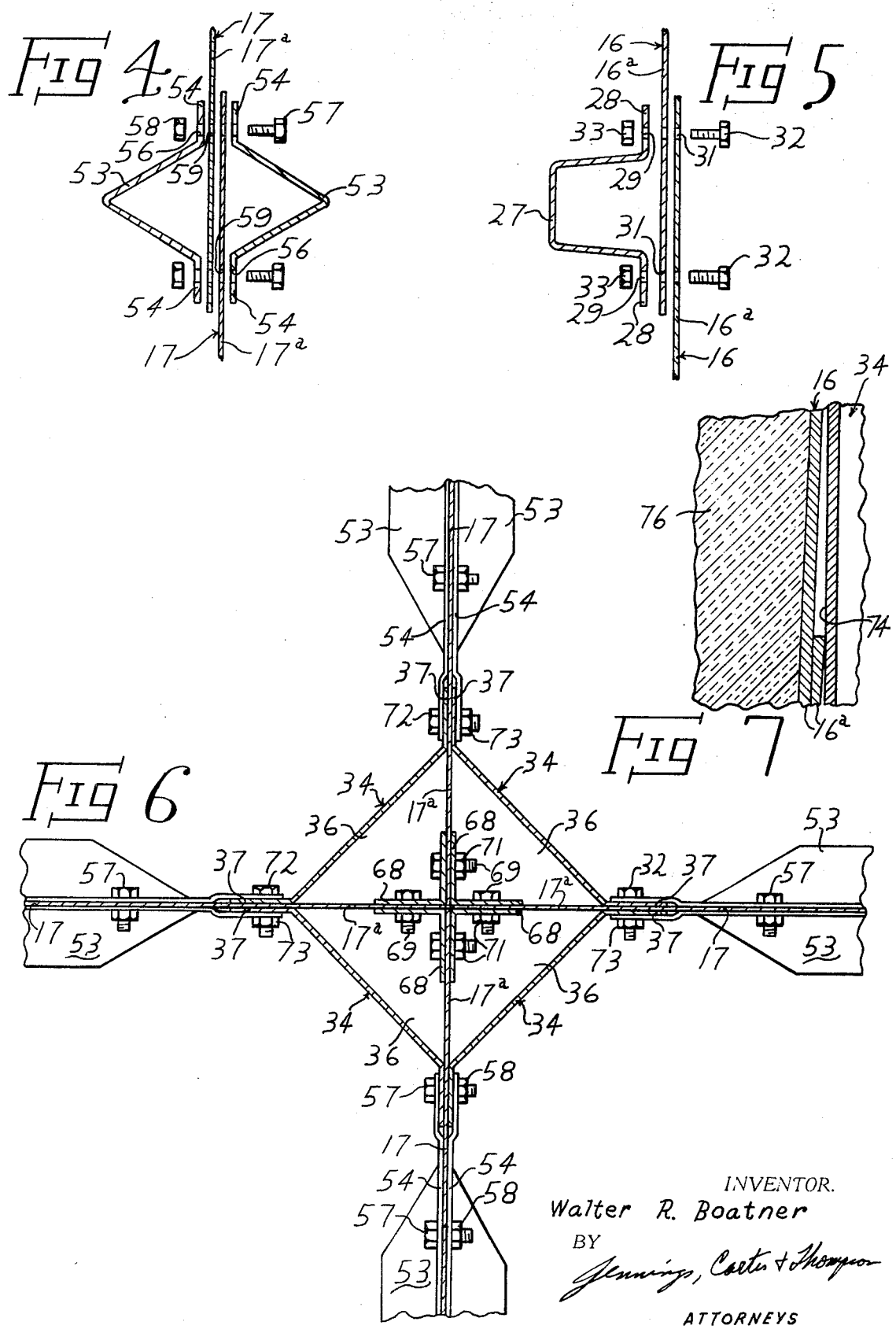
INVENTOR.
Walter R. Boatner
BY
Jennings, Carter & Thompson
ATTORNEYS United States Patent Office 3,512,321
Patented May 19, 1970

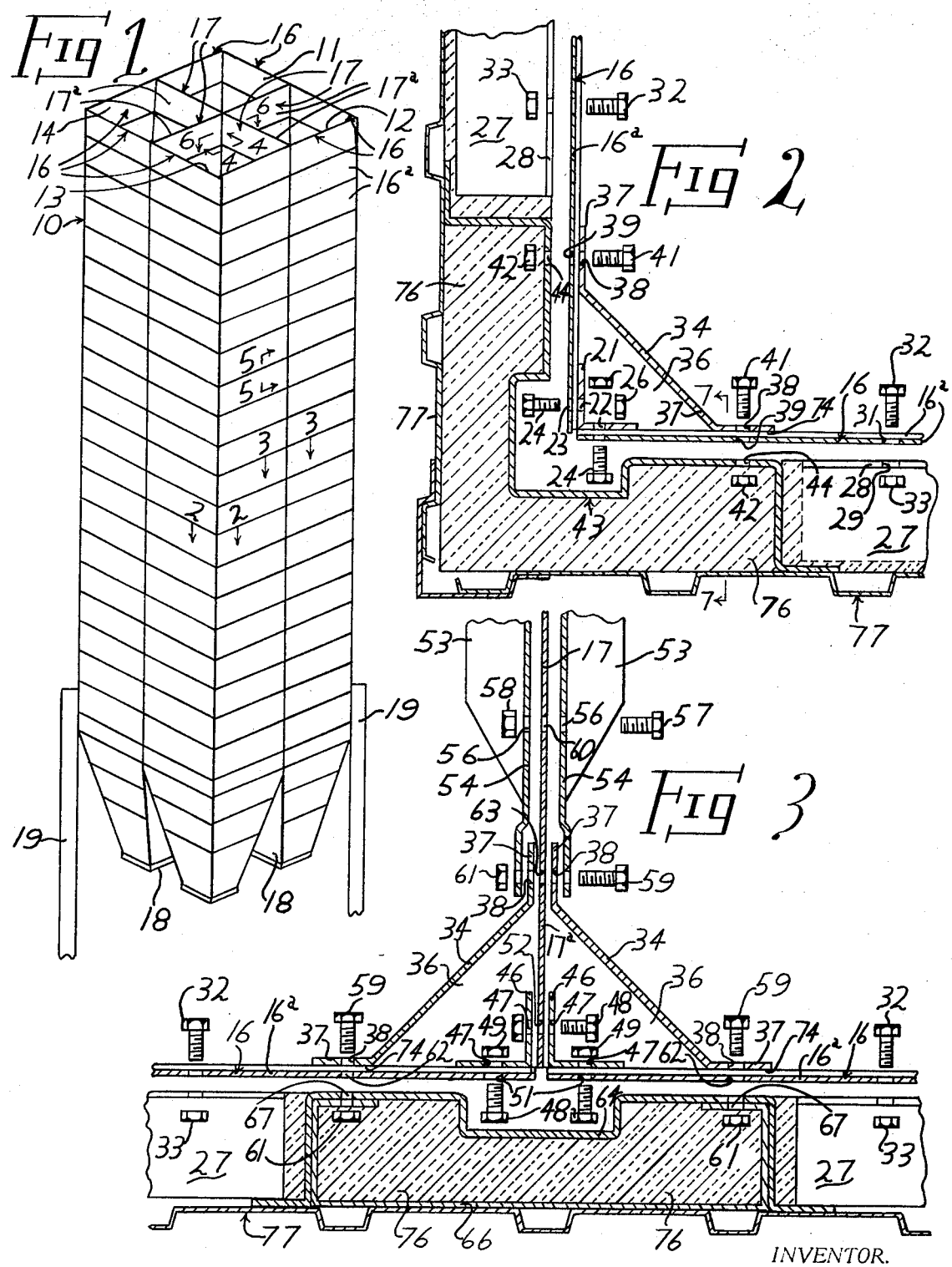

3,512,321
STORAGE BIN
Walter R. Boatner, Gadsden, Ala., assignor to Leach
Manufacturing Company, a corporation of Alabama
Filed May 31, 1968, Ser. No. 733,364
Int. Cl. E04h 7/34; F26b 25/12
U.S. Cl. 52—197                                 6 Claims

ABSTRACT OF THE DISCLOSURE

A storage bin having upstanding side walls with upstanding partition walls therein defining separate storage compartments. An upstanding plate-like corner member extends between adjacent side walls and partition walls at points outwardly of and spaced from adjacent ends of the upstanding walls defining a vertical vent passageway which communicates with other vent passageways defined between the plate-like member and the walls connected thereto.

BACKGROUND OF THE INVENTION

This invention relates to a storage bin and more particularly to a bin for storing dry, flowable materials, such as granular animal feed and the like.

Heretofore in the art to which my invention relates, difficulties have been encountered in removing gases from storage bins and hoppers so as to provide an even flow and thus eliminate bridging. It is very desirable to prevent bridging of the materials in a storage bin due to the fact that the material bridged over will break loose suddenly and then fall downwardly into the hopper whereby many tons of feed fall as a solid mass onto the hopper. This sudden impact of the heavy materials not only damages the hopper but places considerable strains on the side walls of the storage bin. Furthermore, the lack of ventilation in a storage bin, together with excessive heat causes the materials stored to be damaged by condensation of moisture within the bin.

In accordance with my invention, I provide a storage bin having upstanding side walls with partition walls therein defining separate storage compartments. An upstanding plate-like corner member is provided at each corner of the storage bin defining a vertical vent passageway which communicates with the interior of the storage compartment. Accordingly, I not only provide continuous ventilation for the storage compartment from top to bottom thereof but also provide a vertical column at each corner of the storage bin which greatly adds to the overall strength of the storage bin. The continuous, vertical vent passageway provides for good flow characteristics of the bin and also prevents bridging and heavy crash loads on the hopper. The construction and assembly of my improved bin is greatly facilitated by providing a structure wherein one size sheet is employed for all of the vertical walls and partition members, thus eliminating welding and permitting the sheets to be galvanized or prepainted with bolt holes therein prior to assembly. To further reduce condensation within the storage bin, I provide a space between the side walls of the storage bin and outer sheet members for receiving an insulation material whereby the materials stored are not subjected to extremely hot or cold conditions.

A storage bin embodying features of my invention is illustrated in the accompanying drawings, forming a part of this application, in which:

FIG. 1 is a diagrammatic, perspective view showing the side walls and partition walls of a four compartment storage bin, the outer sheet material and insulation being omitted, for the sake of clarity;

FIG. 2 is an enlarged, fragmental view taken generally along the line 2—2 of FIG. 1;

FIG. 3 is an enlarged, fragmental view taken generally along the line 3—3 of FIG. 1;

FIG. 4 is an enlarged, fragmental view taken generally along the line 4—4 of FIG. 1;

FIG. 5 is an enlarged, fragmental view taken generally along the line 5—5 of FIG. 1;

FIG. 6 is an enlarged, fragmental view taken generally along the line 6—6 of FIG. 1; and FIG. 7 is an enlarged, sectional view taken generally along the line 7—7 of FIG. 2, showing the parts in assembled position.

Referring now to the drawings for a better understanding of my invention, I show in FIG. 1 of the drawing a housing 10 for a storage bin for granular materials, such as animal feed and the like. The housing 10 is shown as embodying four separate storage compartments 11, 12, 13 and 14. Each compartment comprises side walls 16 and inner, partition walls 17. In FIGS. 1 and 6 of the drawings, we show four partition walls 17 intersecting each other adjacent the center of the housing 10 of the storage bin. While I have shown the storage bin as comprising only four separate storage compartments, it will be apparent that any number of storage compartments may be provided by adding additional side walls 16 and partition walls 17. Communicating with the lower end of each storage compartment 11, 12, 13 and 14 is a discharge hopper 18 which is provided with suitable means for controlling the flow of materials from the hopper in a manner well understood in the art. The housing 10 for the storage bin may be supported by suitable means, such as structural support members 19 or the like.

As shown in FIG. 1, each side wall 16 and partition wall 17 comprises a plurality of wall sections 16a and 17a, respectively. The individual sheets or wall sections 16a overlap each other so as to form a series of overlapped sheets of material which define the composite wall sections 16. In like manner, a series of overlapped sheets or sections 17a of material are secured to each other so as to provide the composite partition walls 17. The side walls 16 and the inner partition walls 17 extend from the top of the housing 10 to the discharge hoppers 18, as shown.

As shown in FIG. 2, the individual sheets or sections 16a of the side walls 16 abut each other at the corners of the housing 10 and are secured to each other by a vertical angle member 21. Suitable openings 22 and 23 are provided in the angle member 21 and the sheets 16a, respectively, for receiving bolts 24 having nuts 26. Also, the overlapped edges of the sheets or sections 16a of the side walls 16 are connected to each other by horizontally extending, channel-like members 27 having outturned flanges 28 at each side thereof, as shown in FIG. 5. Suitable openings 29 are provided in the flanges 28 and openings 31 are provided in the overlapped portions of the sheets 16a for receiving bolts 32 having nuts 33 whereby the overlapped edges of the sheets 16a are bolted together to form a sturdy construction.

An upstanding plate-like member 34 is provided at each corner of the housing 10, as shown in FIG. 2. The upstanding plate-like member 34 extends between adjacent side walls 16 at points outwardly of and in spaced relation to the adjacent ends of the adjacent side walls. Also, the upstanding plate-like members 34 extend substantially the height of the side walls 16 to define a vertical vent passageway 36 at each corner of the housing 10 which extends from the subjacent hopper 18 to the top of the housing 10. The edges of the upstanding plate-like member 34 are bent inwardly adjacent the upstanding side walls 16 to provide flanges 37 which lie alongside the side walls 16, as shown. Openings 38 are provided in the flanges 37 and aligned openings 39 are provided in the wall section 16a for receiving bolts 41 having nuts 42 whereby the upstanding plate-like members are secured to the side walls 16. Also, as shown in FIG. 2, vertically extending corner members 43 are secured to the vertical side walls 16 by the bolts 41. Suitable openings 44 are provided in the corner members 43 for receiving the bolts 41.

As shown in FIG. 3, the sheets or sections 16a forming adjacent side walls 16 for the compartments 12 and 13 abut each other, or are positioned adjacent each other, and are secured to each other and the adjacent end of a sheet or section 17a by vertical angle members 46 having oepnings 47 therethrough for receiving bolts 48 having nuts 49. Suitable openings 51 are provided in the wall section 16a and suitable openings 52 are provided in the wall section 17a for receiving the bolts 48 whereby the adjacent partition wall 17a is secured firmly to the side wall 16a.

Adjacent, overlapped edges of the section 17a forming the composite partition wall 17 are secured to each other by horizontally extending members 53 having outturned flanges 54. Suitable openings 56 are provided in the flanges 54 for receiving bolts 57 having nuts 58. Suitable openings 60 are provided in the wall sections 17a of the partition wall 17 for receiving the bolts 57. An upstanding plate-like member 34 is also secured to the sheets or sections 16a of the wall 16 and the adjacent partition wall section 17a, as shown in FIG. 3, by bolts 59 having nut 61. Openings 62 are provided in the adjacent wall sections 16a and openings 63 are provided in the partition wall section 17a adjacent thereto for receiving the bolts 59 which pass through the openings 38 provided in the flanges 37 of the plate-like members 34, as shown. The adjacent ends of the sheets or sections 16a at the sides of the bin 10 are also secured to each other by vertical members 64 and 66 having suitably aligned openings 67 therethrough for receiving the bolts 59, as shown in FIG. 3.

As shown in FIG. 6, the sections or sheets 17a abut each other adjacent the center of the housing 10 and are secured to each other by vertical angle members 68 having suitable openings therethrough for receiving retaining bolts 69 having nuts 71. Suitable openings are provided through the sheets 17a for receiving the bolts 69, as shown in FIG. 6. Adjacent partition walls 17 at the center of the bin housing 10 are secured to each other by the upstanding plate-like members 34 described hereinabove. Suitable openings are provided through the sheets 17a for receiving bolts 72 having nuts 73. The bolts 72 pass through the openings 38 provided in the flanges 37 as described hereinabove.

As shown in FIGS. 2, 3, and 6, the upstanding plate-like members 34 define continuous vertical passageways 36 adjacent each corner of each storage bin compartment 11, 12, 13 and 14 whereby air is free to pass from each storage compartment into the vertical passageways 36 associated therewith. That is, passageways 74 are provided between the upstanding plate-like members 34 and the overlapped sections 16a and 17a, as the case may be. As clearly shown in FIG. 7, a substantial space 74 is provided between the upstanding plate-like member 34 and the overlapped sheet members 16a at the point of overlap. Also, the bolt connection between the sections or sheets 16a and the connections between the sections 17a provide for some passage of air from the storage compartments into the vertical passageways 36 associated therewith.

As shown in FIGS. 2, 3 and 7, I provide insulation material 76 between the side walls 16 and an outer covering for the storage bin. The outer covering may be in the form of a corrugated-like material 77 which is secured to the vertical support members 43, 64 and 66 and the outer surface of the horizontal channel members 27 which connect the adjacent sheet members 16a to each other.

From the foregoing, it will be seen that air is free to pass from each storage compartment 11, 12, 13 and 14 through the passageways 74 into the continuous passageways 36 whereby there is free movement of air from all portions of the storage compartments thus reducing bridging and at the same time ventilation is provided for the materials stored in the storage compartments. Where relatively loose materials are stored in the storage compartments suitable gases or air may be circulated upwardly through the storage compartments to dry or treat the materials stored therein.

From the foregoing, it will be seen that I have devised an improved storage bin which permits free ventilation and circulation of air from each storage compartment to a vertical, continuous air passageway at each corner of the storage compartment. By providing a bolted construction throughout the storage bin construction, the individual sheets forming the side walls 16 and partition walls 17 may be painted or pre-treated and the openings provided therein prior to assembly. Also, the bolted construction facilitates installation and at the same time provides some space for the circulation of air between the overlapped sections. By providing the upstanding angle members 21, 46 and 68, the individual sections 16a and 17a may be secured in place to a substantial elevation prior to installation of the vertical plate-like members 34. My improved construction may be employed with a flat steel roof or a concrete roof and the individual storage compartments may be easily divided into half compartments or quarter compartments with a minimum of effort. Furthermore, by providing the upstanding plate-like members, I greatly add to the overall strength of the storage bin and at the same time provide the continuous vertical passageways 36 for the free movement of air between the individual storage compartments and the vertical passageways 36 which in turn extend from the subjacent hopper units to the top of the bin structure.

While I have shown my invention in but one form, it will be obvious to those skilled in the art that it is not so limited, but is susceptible of various other changes and modifications without departing from the spirit thereof.

What I claim is:
1. A storage bin for granular materials comprising:
  (a) a housing having upstanding side walls comprising overlapped sheets of material,
  (b) at least one upstanding partition wall within said housing comprising overlapped sheets of material and defining separate storage compartments,
  (c) discharge means adjacent the lower end of said storage compartments,
  (d) an upstanding plate-like member at a corner of said storage compartment extending between adjacent side walls and partition walls at points outwardly of and in spaced relation to adjacent ends of said adjacent walls and extending substantially the height of said walls to define a vertical vent passageway at the corner of the storage compartment,
  (e) means securing said plate-like member to said overlapped sheets of said adjacent walls defining other vent passageways therebetween spaced longitudinally along said plate-like member and communicating said storage compartment with said vertical vent passageway for the passage of gases from said storage compartment to said vertical vent passageway, and
  (f) horizontally extending frame members connecting adjacent ones of said overlapped sheets of material to each other with bolt-like members passing through openings in said frame members and said overlapped sheets of material.

2. A storage bin as defined in claim 1 in which said frame members connected to said upstanding side walls are positioned at the outer sides of said side walls and project outwardly thereof to provide supporting surfaces in spaced relation to said side walls and outer sheet members are secured to said supporting surfaces.

3. A storage bin as defined in claim 2 in which insulating material is positioned between said outer sheet members and said upstanding side walls.

4. A storage bin as defined in claim 1 in which the edges of said plate-like member are bent inwardly adjacent said upstanding walls defining flanges which lie alongside said walls.

5. A storage bin as defined in claim 4 in which openings are provide through said flanges and the adjacent ends of said walls and bolts extend through said openings to secure said plate-like member to said walls.

6. A storage bin as defined in claim 1 in which adjacent ends of adjacent side walls and partition walls are also secured to each other by vertical angle members.

References Cited

UNITED STATES PATENTS

| | | | |
|---|---|---|---|
| 733,435 | 7/1903 | Spelman | 52—234 |
| 1,929,084 | 10/1933 | Strub | 98—55 |
| 2,251,660 | 8/1941 | Chipley | 52—303 X |
| 3,157,106 | 11/1964 | Leach | 98—55 |
| 3,292,324 | 12/1966 | Cole | 52—234 X |

ALFRED C. PERHAM, Primary Examiner

U.S. Cl. X.R.

52—303; 98—55